United States Patent
Molner et al.

(10) Patent No.: US 9,389,991 B1
(45) Date of Patent: Jul. 12, 2016

(54) METHODS, SYSTEMS, AND COMPUTER READABLE MEDIUMS FOR GENERATING INSTRUCTION DATA TO UPDATE COMPONENTS IN A CONVERGED INFRASTRUCTURE SYSTEM

(71) Applicant: VCE Company, LLC, Richardson, TX (US)

(72) Inventors: Matthew John Molner, Cary, NC (US); Joshua Lee Bonczkowski, Apex, NC (US); Todd Dolinsky, Chapel Hill, NC (US); Nicholas Hansen, Willow Spring, NC (US)

(73) Assignee: VCE COMPANY, LLC, Richardson, TX (US)

( * ) Notice: Subject to any disclaimer, the term of this patent is extended or adjusted under 35 U.S.C. 154(b) by 0 days.

(21) Appl. No.: 14/144,025

(22) Filed: Dec. 30, 2013

Related U.S. Application Data

(60) Provisional application No. 61/878,325, filed on Sep. 16, 2013.

(51) Int. Cl.
*G06F 9/44* (2006.01)
*G06F 9/445* (2006.01)
(Continued)

(52) U.S. Cl.
CPC .............. *G06F 11/3688* (2013.01); *G06F 8/60* (2013.01); *G06F 8/61* (2013.01); *G06F 11/3466* (2013.01)

(58) Field of Classification Search
CPC ..... H04L 41/22; H04L 41/022; H04L 41/042; H04L 67/06; G06F 8/65; G06F 8/71; G06F 8/665; G06F 8/61; G06F 11/3688; G06F 11/3466; G06F 11/3636; G06F 8/60
See application file for complete search history.

(56) References Cited

U.S. PATENT DOCUMENTS 6,789,215 B1  9/2004  Rupp et al.
8,671,228 B1 *  3/2014  Lok ..................... G06F 9/45558
                                                        710/15
(Continued)

FOREIGN PATENT DOCUMENTS

WO    WO 2015/038241 A1    3/2015

OTHER PUBLICATIONS

VCE Company, LLC, VCE Support Overview, 2012, 5 pages.*

(Continued)

*Primary Examiner* — Thuy Dao
(74) *Attorney, Agent, or Firm* — Jenkins, Wilson, Taylor & Hunt, P.A.

(57) ABSTRACT

Methods, systems, and computer readable mediums for generating instruction data to update components in a converged infrastructure system are disclosed. According to one example, a method includes identifying components in a converged infrastructure system that require remediation in order to comply with a defined converged infrastructure configuration and identifying remediation content to enable each of the identified components to be compliant with the defined converged infrastructure configuration. The method further includes determining a remediation process based on the identified remediation content associated with the components of the converged infrastructure system, wherein the determined remediation process includes an order of steps used to update the identified components in the converged infrastructure system. The method also includes generating instruction data indicating the determined remediation process to be applied to the identified components in the converged infrastructure system.

14 Claims, 4 Drawing Sheets

(51) Int. Cl.
*G06F 11/36* (2006.01)
*G06F 11/34* (2006.01)

(56) References Cited

U.S. PATENT DOCUMENTS

| | | | | |
|---|---|---|---|---|
| 8,869,143 B2* | 10/2014 | Bocking | ............ | G06F 8/60 717/174 |
| 8,924,941 B2* | 12/2014 | Krajec | ............ | G06F 11/3466 717/125 |
| 9,065,746 B2* | 6/2015 | Dolinsky | ............ | H04L 41/0856 |
| 2004/0078726 A1* | 4/2004 | Little | ............ | G06F 11/2257 714/48 |
| 2010/0082803 A1 | 4/2010 | Nguyen | | |
| 2012/0254852 A1 | 10/2012 | Emaru | | |
| 2013/0014107 A1* | 1/2013 | Kirchhofer | ............ | 718/1 |
| 2013/0047153 A1* | 2/2013 | Emaru | ............ | 718/1 |
| 2013/0308495 A1 | 11/2013 | Tucker et al. | | |
| 2014/0259000 A1* | 9/2014 | Desanti | ............ | G06F 8/65 717/171 |
| 2014/0282395 A1* | 9/2014 | Wang | ............ | G06F 8/71 717/120 |
| 2015/0082016 A1 | 3/2015 | Bonczkowski et al. | | |
| 2015/0212812 A1* | 7/2015 | Tripathi | ............ | G06Q 10/0633 717/120 |

OTHER PUBLICATIONS

Yamakami et al., Foundation-based mobile platform software engineering: implications to convergence to open source software, Nov. 2009, 6 pages.*
VCE Company, VCE Vision Intelligent Operations Software for Converged Infrastructure, 2015, 7 pages.*
Notification of Transmittal of the International Search Report and the Written Opinion of the International Searching Authority, or the Declaration for International Patent Application No. PCT/US2014/047585 (Oct. 22, 2014).
Non-Final Office Action for U.S. Appl. No. 14/143,979 (Dec. 9, 2015).
Non-Final Office Action for U.S. Appl. No. 14/143,979 (Jun. 26, 2015).
"VBLOCK™ Solution for Application Lifecycle Platform," VCE, pp. 1-33 (Aug. 2011).

* cited by examiner

METHODS, SYSTEMS, AND COMPUTER READABLE MEDIUMS FOR GENERATING INSTRUCTION DATA TO UPDATE COMPONENTS IN A CONVERGED INFRASTRUCTURE SYSTEM

PRIORITY CLAIM

This application relates and claims priority to U.S. Provisional Patent Application Ser. No. 61/878,325 filed on Sep. 16, 2013, the disclosure of which is incorporated herein by reference in its entirety.

TECHNICAL FIELD

The subject matter described herein relates to updating hardware and software system components. More specifically, the subject matter relates to methods, systems, and computer readable mediums for generating instruction data to update components in a converged infrastructure system.

BACKGROUND

In the converged infrastructure system (CIS) industry, CIS models may be validated to run very specific versions of firmware and software that have been thoroughly tested and verified to function properly when combined. This validation process enables customers (i.e., system administrators or operators) to avoid spending a significant amount of time conducting their own validations to determine versions of compatible CIS component software. Notably, the aforementioned validation process results in a Release Certification Matrix (RCM) or some other type of defined converged infrastructure (CI) configuration model for a specific CIS model.

SUMMARY

Methods, systems, and computer readable mediums for generating instruction data to update components in a converged infrastructure system are disclosed. According to one embodiment, a method includes identifying components in a converged infrastructure system that require remediation in order to comply with a defined converged infrastructure configuration and identifying remediation content to enable each of the identified components to be compliant with the defined converged infrastructure configuration. The method further includes determining a remediation process based on the identified remediation content associated with the components of the converged infrastructure system, wherein the determined remediation process includes an order of steps used to update the identified components in the converged infrastructure system. The method also includes generating instruction data indicating the determined remediation process to be applied to the identified components in the converged infrastructure system.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for generating instruction data to update components in a converged infrastructure system (CIS). As used herein, CISs, such as Vblock™ Systems from VCE Company, LLC, can comprise multiple components or elements in a preconfigured or prepackaged computing platform. For example, a CIS can comprise a computing platform or unit associated with racks of physical components and related software for performing virtualization and/or other functions. In some embodiments, a CIS can comprise multiple components that include one or more computing components, software components, networking components, storage components, hardware components, and/or firmware components. For example, an exemplary CIS can comprise data storage devices, servers, networking equipment, and software for managing physical resources and/or virtualized resources (e.g., virtual servers).

The disclosed subject matter assists a system administrator (e.g., a CIS administrator) to facilitate the migration of a CIS from a non-compliant CI configuration to a supported CI configuration. For example, if the CIS is not in a supported configuration (e.g., CIS components include outdated firmware, BIOS, software, etc.), the disclosed subject matter enables the system administrator to properly remediate one or more of the components within the CIS so that the components are compliant with a supported CIS configuration. Notably, the disclosed subject matter is capable of conducting an assessment at the converged infrastructure system level to determine what CIS components require an update (e.g., a software and/or firmware update) and subsequently generate instruction data (e.g., a PDF file or equivalent) that specifies step-by-step instructions to be used by a system administrator or other user to conduct a manual CIS update (e.g., a remediation process).

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
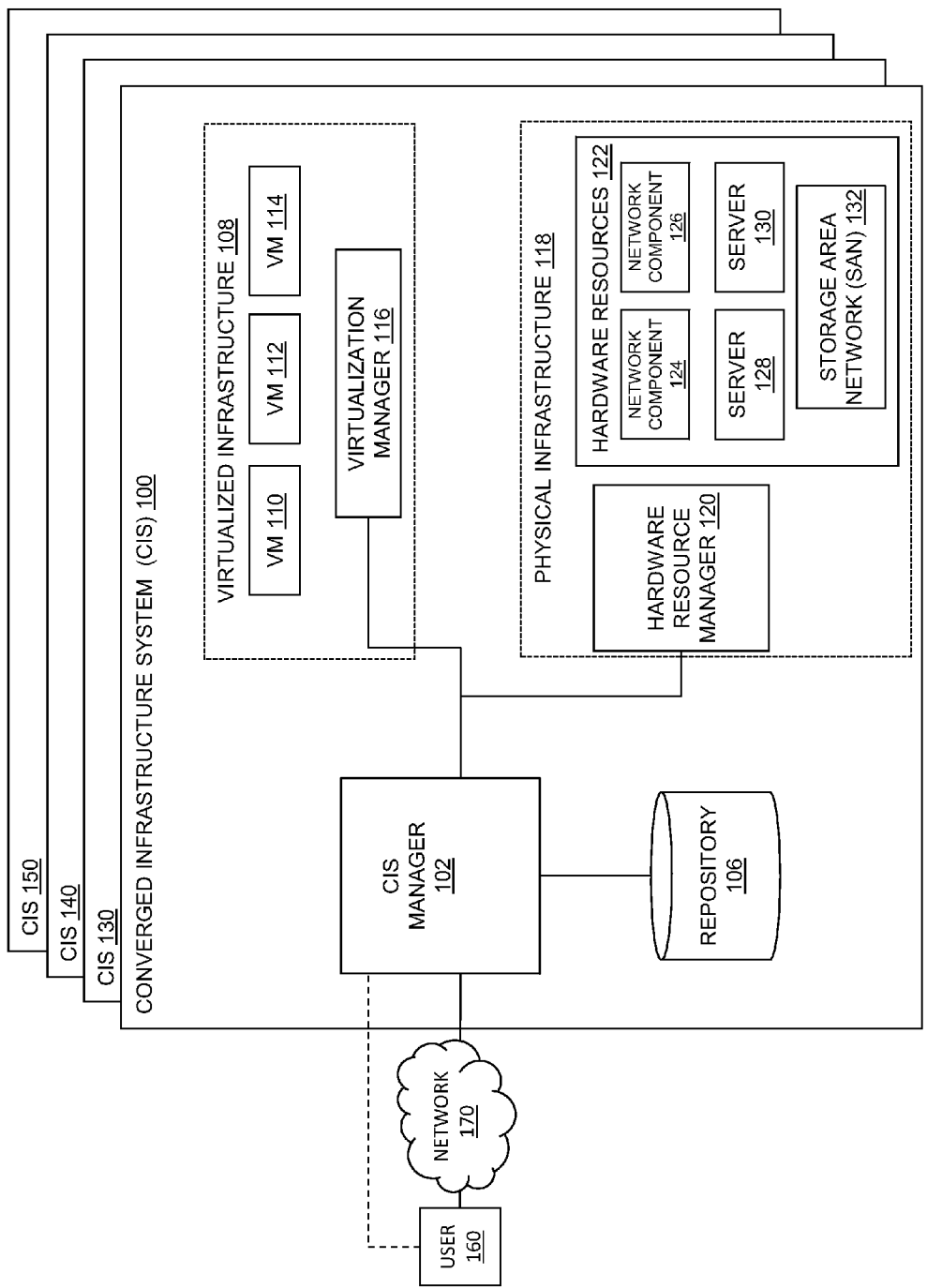
FIG. 1 is a diagram illustrating an exemplary converged infrastructure system according to an embodiment of the subject matter described herein.

FIG. 1 is a block diagram illustrating exemplary CIS 100, CIS 130, CIS 140, and CIS 150 according to an embodiment of the subject matter described herein. Each of CIS 100, CIS 130, CIS 140, and CIS 150 can comprise CIS components, which include one or more physical resources and one or more virtual resources. Exemplary physical resources can comprise a processor, a server, network equipment, a router, a switch, wiring or cabling, a storage device, a physical port, and/or a communications interface. Exemplary virtual resources can comprise a virtual entity (e.g., an entity that appears as a physical entity but comprises one or more components associated with one or more CISs), a virtual machine, a virtual server, a virtual storage device, a virtual port, and/or a virtual communications interface. Each of CIS 100, CIS 130, CIS 140, and CIS 150 may also comprise software and related components for managing the CIS and/or portions therein.

In some embodiments, each of CIS 100, CIS 130, CIS 140, and CIS 150 may be configured to provide data center functionality, cloud service functionality, and/or other functionality. In some embodiments, each of CIS 100, CIS 130, CIS 140, and CIS 150 can comprise similar components and may be located at one or more physical locations or sites. Each of CIS 100, CIS 130, CIS 140, and CIS 150 may be capable of communicating with each other and may communicate with various other entities, such as network nodes (e.g., servers hosting online sites) and users. For example, user 160 (e.g., a human system administrator or an automated system) may use an application programming interface (API) or web-based graphical user interface (GUI) to access CIS 100 and/or a related CIS component for conducting a CI configuration update. In some embodiments, user 160 may establish communication directly to CIS 100 without use of network 170.

In some embodiments, CIS 100 can comprise a CIS manager 102 (e.g., a CIS management module), a repository 106, virtualized infrastructure 108, and/or physical infrastructure 118. CIS manager 102 may be any suitable entity for managing aspects of CIS 100. CIS manager 102 may be configured to communicate with various CIS components, such as virtual resources, physical resources, and/or software for managing various components. For example, CIS manager 102 can be configured to access each CIS component within CIS 100 and return relevant information to user 160. For example, CIS manager 102 may be configured to manage performance, resource utilization levels, and other aspects associated with virtualized infrastructure 108 and/or physical infrastructure 118. In some embodiments, CIS manager 102 comprises VCE Vision™ Intelligent Operations software and/or firmware. In some embodiments, CIS manager 102 may have access to remediation content (such as remediation software content that comprises binary software) needed to remediate and update each CIS component in one or more of CIS 100, CIS 130, CIS 140, and CIS 150.

Virtualized infrastructure 108 can comprise a virtualization environment configured to simulate components of a computing device, e.g., a processor, system memory, and a storage device, for executing one or more virtual machines (VMs) (e.g., VM 110, VM 112, and VM 114). Each of VM 110, VM 112, and VM 114 may be configured to perform various functions and/or services, such as web server functions or cloud application services, and may interact with various nodes, components, and/or users.

In some embodiments, virtualized infrastructure 108 may be associated with one or more virtual entities. Each virtual entity can comprise one or more CIS or portions therein, e.g., resources from one or more CISs. In some embodiments, virtualization manager 116 may allow logical entities to be created, deleted, or modified using an API and/or GUI. Virtualization manager 116 may be any suitable entity (e.g., software executing in a virtual machine) for managing aspects associated with virtualized infrastructure 108. In some embodiments, virtualization manager 116 may be configured to provide data center management through one or more communications interfaces. For example, virtualization manager 116 may communicate with one or more third-party management tools using APIs.

Physical infrastructure 118 can comprise hardware resources 122, such as network components 124-126, servers 128-130 (sometimes referred to as "hosts"), and at least one storage area network (SAN) 132. Hardware resources 122 may be communicatively connected to various other components in CIS 100 and other entities. Hardware resources 122 can be configured to be used by one or more virtual entities. In some embodiments, network components 124-126 (e.g., network switches) may be configured to enable communication between the components in CIS 100. For example, server 128 and SAN 128 may be used in implementing VM 110 and VM 112 and server 130 and SAN 132 may be used in implementing VM 114 and virtualization manager 116. In some embodiments, one or more file share storage (FSS) systems (not shown) can be utilized to provide file system level access to a CIS across a local area network (LAN).

Physical resource manager 120 may be any suitable entity (e.g., software executed in a virtual machine) for managing aspects associated with physical infrastructure 118. In some embodiments, physical resource manager 120 may be configured to provision hardware resources 122 via one or more communications interfaces. For example, physical resource manager 120 may provision hardware resources 122 for implementing one or more virtual entities in virtualized infrastructure 108. In some embodiments, physical resource manager 120 may comprise any management element or entity, such as a unified infrastructure manager (UIM) or a unified computing system (UCS) director entity, which is configured to provision the physical hardware of CIS 100.

Repository 106 may include any data storage unit (e.g., a database or plurality of databases) that may be configured to store remediation software content (e.g., various versions of CIS component software and/or firmware that may be utilized to migrate to a defined CI configuration) used to update CIS components. In some embodiments, the remediation software content can comprise at least one firmware package, a BIOS package, a software package, and/or any other package configured to contain binary software content. Although FIG. 1 depicts repository 106 as a local data storage unit residing on CIS 100, repository 106 can also be embodied as a data storage unit located at an online location (e.g., a public distributed content site), on a local proxy server in a customer's or system administrator's environment, or on a different CIS without departing from the scope of the disclosed subject matter.

In some embodiments, repository 106 can be provisioned with remediation software content sourced from a second repository (e.g., from a second CIS or from an online location, such as a known, online site that may be hosted by the creators of the remediation software content). For example, the remediation software content may be obtained or copied from a second repository (e.g., a second CIS, an online site, online repository, or any other online location) over network 170, using secure copy (SCP) protocol, file transfer protocol (FTP), or any like protocol. In some embodiments, CIS 100 and a second CIS (not shown) may be located at a common site and can be communicatively connected by a wired connection. In such a configuration, repository 106 may be provisioned with remediation software content from the second CIS via the wired connection. It is understood that the provisioning of repository 106 with remediation software content with the exemplary methods described above may be conducted via any automated or automatic manner. In addition, the provisioning of remediation software content copied from a second repository and installed into repository 106 may be conducted using any form of transportable media, such as a compact disc (CD), universal serial bus (USB) device, and the like. In some embodiments, repository 106 may be provisioned with remediation software content prior to CIS manager 102 determining the defined CI configuration to be applied and/or the identification of CIS components that require an update in accordance to a defined CI configuration. Additional description and functionality of repository 106 is provided below. It will be appreciated that FIG. 1 is for illustrative purposes and that various components, their locations, and/or their functions as described above in relation to FIG. 1 may be changed, altered, added, or removed.

Figure 2:
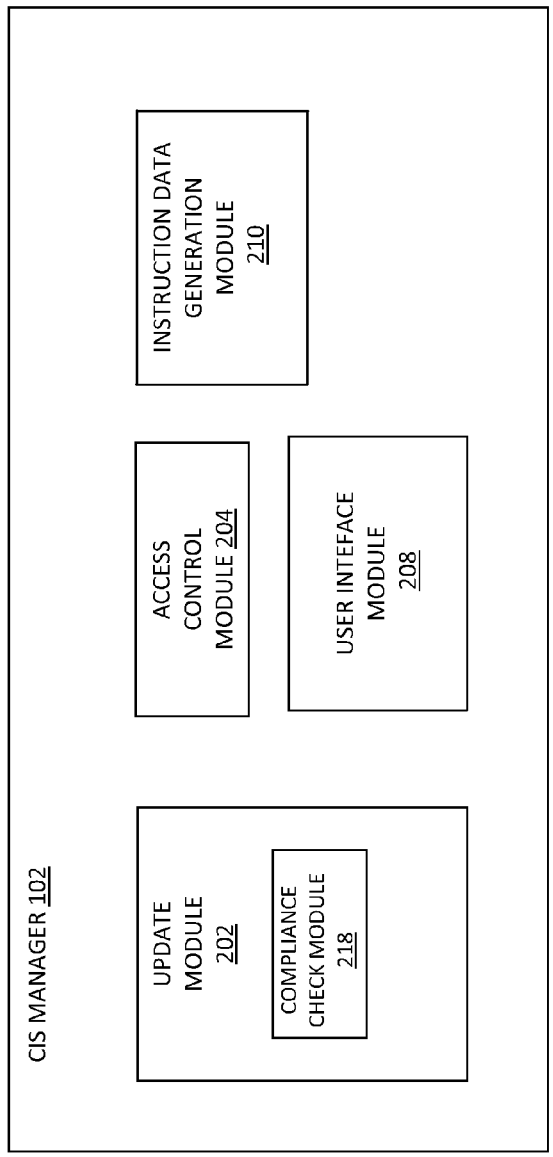
FIG. 2 is a diagram illustrating an exemplary converged infrastructure system management module according to an embodiment of the subject matter described herein.

FIG. 2 is a diagram illustrating an exemplary CIS management module according to an embodiment of the subject matter described herein. In FIG. 2, CIS manager 102 comprises a plurality of modules, such as a CI configuration update module 202, an access control module 204, a user interface (UI) module 208, and an instruction data generation module 210. Although FIG. 2 depicts modules 202, 204, 208, 210 and 218 as being included in CIS manager 102, one or more of these modules may be located externally to and/or be separate from CIS manager 102 in other embodiments without departing from the scope of the disclosed subject matter. In some embodiments, CIS manager 102 may be comprised of one or more compute systems that are either physical or virtual. Each of these components is described in greater detail below.

In some embodiments, update module 202 may comprise an update framework module or any suitable entity (e.g., software executing on a processor) for facilitating a CI configuration update. For example, update module 202 may be configured to receive CI configuration selection information, conduct a compliance check to determine if CIS is compliant with the selected CIS configuration, instruct access control module 204 to conduct authorization and authentication processes, identify/obtain remediation software content data from repository 106 or other location (e.g., via network 170), and perform any additional actions required to conduct a CI configuration update on CIS 100.

In some embodiments, update module 202 can interact with access control module 204. Access control module 204 can comprise any suitable entity (e.g., hardware, firmware, or software in combination with hardware and/or firmware) for configuring and/or implementing access, authentication, and/or authorization functions. Access control module 204 can comprise or provide one or more communication interfaces for interacting with user 160, virtualized infrastructure 108, physical infrastructure 118, and/or other entities, such as nodes in network 170, CIS 130, CIS 140, and CIS 150 (as depicted in FIG. 1). In some embodiments, access control module 204 can be configured to perform an authentication and/or authorization check on a system administrator (e.g., user 160) seeking access to CIS 100 or submitting CI configuration selection information. For example, access control module 204 can utilize a central authentication service (CAS) or another authentication mechanism for authenticating a user. After authenticating and/or authorizing user 160, access control module 204 can allow the authorized user to view and/or modify access control related settings, e.g., via a GUI generated by user interface module 208 or an API (if user 160 is an automated system). In some embodiments, access policies utilized by access control module 204 can comprise one or more permissions to utilize a service, a resource, or a component associated with performing a CI configuration update.

In some embodiments, update module 202 may include a compliance check module 218 that can be configured to identify the CIS components that require remediation and/or updating in order to comply with a designated CI configuration (e.g., as selected by a system administrator or operator). In some embodiments, update module 202 may also include a system library (not shown) that may be used in conjunction with a compliance check module 218 in order to communicate with and obtain data from the CIS components. For example, upon receiving the selection information associated with a defined CI configuration to be applied to a CIS, compliance check module 218 may be configured to compare revision identifiers of the CIS components (e.g., the revision/version number of the associated CIS component firmware, BIOS, software, drivers, etc.) associated with the selected defined CI configuration to the revision identifiers (e.g., current revision software numbers) of the CIS components presently utilized by CIS 100. These revision identifiers or version numbers may comprise any number or combination of letters, numbers, and/or symbols. If the current revision numbers of CIS components in CIS 100 do not match the revision numbers specified in the CI configuration, then compliance check module 218 may identify the non-matching CIS components as non-compliant CIS components. Compliance check module 218 may subsequently generate a record listing these non-compliant CIS components (i.e., CIS components that require remediation in order to comply with the selected CI configuration) for use by update module 202.

In some embodiments, update module 202 may also be configured to determine (e.g., identify and/or locate) the remediation software content needed in order to update each of the identified CIS components to become compliant with the defined CI configuration. For example, update module 202 may determine whether the remediation software content (e.g., update software of the requisite revision number) for the identified non-compliant CIS components is stored in one or more locations on repository 106 or in some other repository (e.g., in a second CIS or an online location). If the remediation software content is not stored in repository 106, update module 202 may send a query message to request the transfer of the remediation software content to repository 106 or to a request for location information (e.g., an IP address, database address, etc.) indicating one or more locations of the identified remediation software content on the second repository. In some embodiments, update module 202 may also be configured to analyze the identified remediation software content to derive a remediation process for the non-compliant CIS components. For example, update module 202 can be configured to consider the non-compliant CIS components associated with the identified remediation software content to determine one or more orders or sequences that the non-compliant CIS components can be updated. In some embodiments, update module 202 can be configured to determine an optimized remediation process that takes into account the interoperability of the non-compliant CIS components within a CIS. For example, update module 202 can be configured to process the identified remediation software content, data identifying the non-compliant CIS components, and/or other system data in order to derive the remediation process. By utilizing at least a portion of the aforementioned data, update module 202 can determine one or more optimized remediation processes that omit or collapse superfluous steps. Exemplary optimized remediation processes determined by update module 202 may comprise i) the minimum number and order of steps needed to update all of the non-compliant CIS components in the CIS, ii) a specific ordering of steps that would introduce the least amount of downtime or disruption to the CIS, and/or the like.

In some embodiments, instruction data generation module 210 may be configured to generate instruction data specifying the remediation process determined by update module 202. For example, upon determining the remediation process to be applied to the non-compliant CIS components, update module 202 may provide an order of steps included in the remediation process to instruction data generation module 210. After receiving this information, instruction data generation module 210 may be configured, either automatically or in response to a request by a system administrator, to generate the instruction data. The instruction data may be embodied in any one of a number of different forms or formats. For example, the instruction data may comprise an electronic document form (e.g., an electronic PDF file or Word file), a physical document form (e.g., a document printout or any other tangible form), and/or a visual display form (e.g., a screen display). Instruction data generation module 210 may utilize any equipment (e.g., a printer), GUI, or computer readable medium to generate the instruction data.

Figure 3:
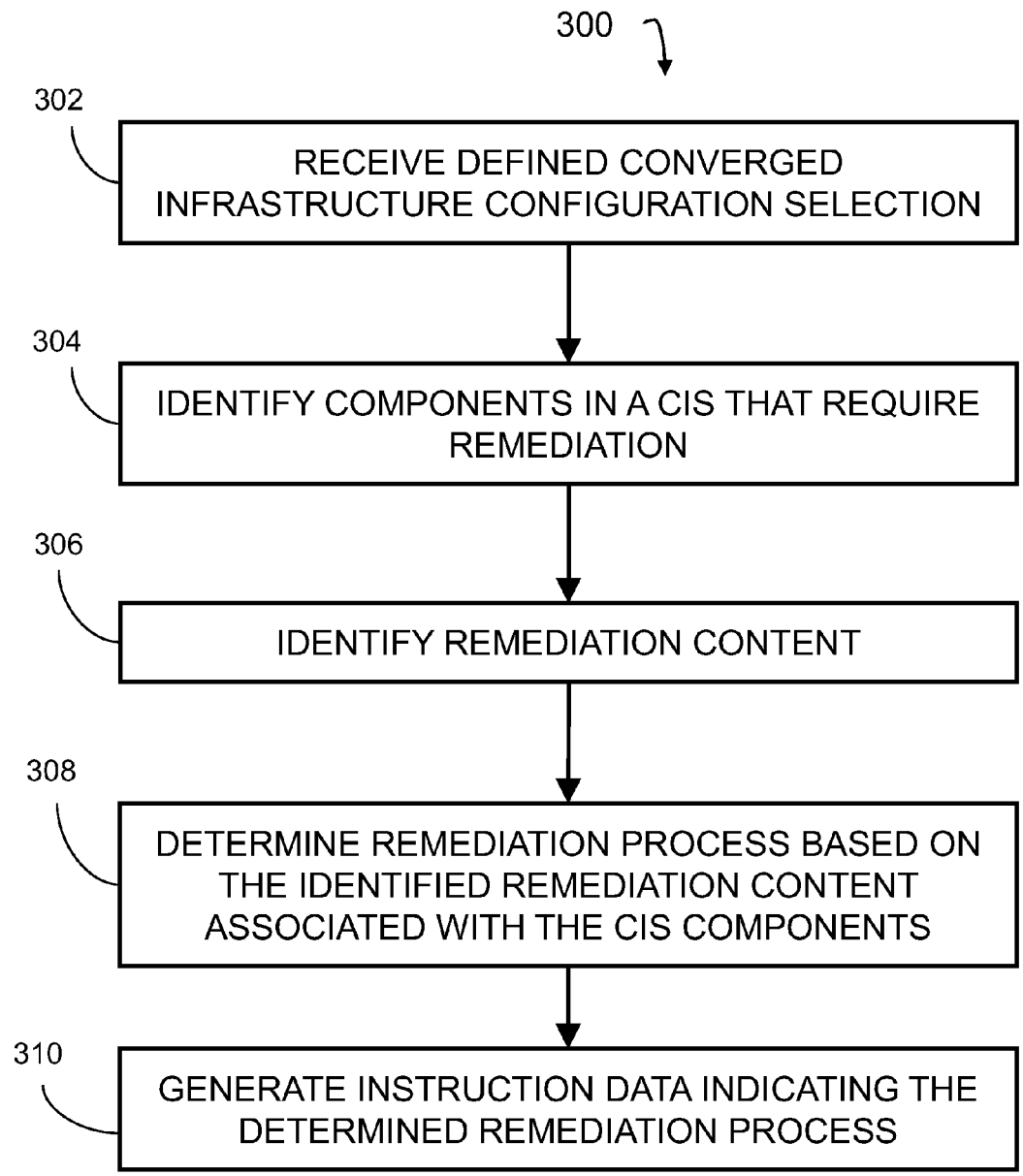
FIG. 3 is a diagram illustrating an exemplary method for generating instruction data to update components in a converged infrastructure system according to an embodiment of the subject matter described herein.

FIG. 3 is a diagram illustrating an exemplary method generally designated 300 for generating instruction data to update components in a converged infrastructure system according to an embodiment of the subject matter described herein. For illustrative purposes and explanation, references to elements included in FIG. 1 and FIG. 2 are made below.

At step 302, selection information indicating a defined CI configuration to be applied to a CIS is received. In some embodiments, CIS manager 102 may be configured to receive selection information that specifies a desired CI configuration to be applied to a CIS (e.g., CIS 100 in FIG. 1) from a system administrator. For example, a system administrator (e.g., user 160 in FIG. 1) can utilize a GUI generated by user interface module 208 to provide the selection information to CIS manager 102 in CIS 100 for processing. In other embodiments, an automated system configured to select and determine CI configurations to be used to remediate a CIS may be used to generate and send CI configuration selection information to CIS manager 102.

At step 304, components in the CIS are identified. In some embodiments, CIS manager 102 utilizes compliance check module 218 to identify components of CIS 100 that require remediation in order to comply with the selected CI configuration. For example, compliance check module 218 may be configured to compare the revision numbers of the CIS components associated with the selected CI configuration to the revision numbers of the actual CIS components in the CIS. If the revision numbers of CIS components do not match the revision numbers specified in the CI configuration, then those associated CIS components (i.e., non-compliant CIS components) require remediation to comply with the selected CI configuration.

At step 306, remediation content is identified. In some embodiments, update module 202 in CIS manager 102 is configured to determine (e.g., identify and/or locate) the remediation content, such as remediation software content, needed in order to update each of the identified CIS components to become compliant with the defined CI configuration. For example, update module 202 may determine whether remediation software content (e.g., update software of the requisite revision number) for the identified non-compliant CIS components is currently stored one or more locations in repository 106. If any portion of the remediation software content (e.g., a remediation software content package for one or more non-compliant CIS components) is not currently stored in repository 106, then update module 202 may be configured to send a query message to a second repository. For example, update module 202 message can send a query message to either an online location repository or to another repository located on a second CIS in order to determine whether that repository contains the necessary remediation software content. In some embodiments, the query message sent by update module 202 may include either a request to transfer the identified remediation software content to repository 106 or a request for location information (e.g., an IP address, database address, etc.) indicating the location of the identified remediation software content on the second repository.

At step 308, a remediation process based on the identified remediation content is determined. In some embodiments, update module 202 analyzes the identified remediation software content to derive a remediation process for the non-compliant CIS components. For example, update module 202 can be configured to consider the non-compliant CIS components associated with the identified remediation software content to determine an order (e.g., an order comprising sequential steps and/or contemporaneous steps) in which the non-compliant CIS components are to be updated. Notably, the remediation process derived by update module 202 includes a number of ordered steps that may be followed to update the non-compliant CIS components. In some embodiments, update module 202 can be configured to determine one or more optimized remediation processes that account for the interoperability of the CIS components being updated. For example, update module 202 can be configured analyze the identified remediation content, data identifying the non-compliant CIS components, and/or other system data in order to determine the remediation process. In some embodiments, update module 202 can be configured to determine the minimum number of steps that is needed to update all of the non-compliant CIS components in the CIS. Likewise, update module 202 may be configured to determine a specific ordering of steps that would introduce the least amount of downtime (or disruption) to the CIS. In some embodiments, the defined CI configuration itself specifies the remediation process (e.g., the CI configuration indicates a suggested order to update the non-compliant CIS components).

At step 310, instruction data indicating the determined remediation process is generated. In some embodiments, instruction data generation module 210 may utilize (e.g., obtain access to or be provided with) the determined remediation process from update module 202 and subsequently generate instruction data that sets forth the determined remediation process to be applied to the identified CIS components (i.e., the non-compliant CIS components). In some alternative embodiments, the remediation software content may be identified (e.g., update module 202 specifies the requisite software version number), but is not located in step 306. In such embodiments, the instruction data may direct the system administrator to attempt to locate the remediation software content online.

Figure 4:
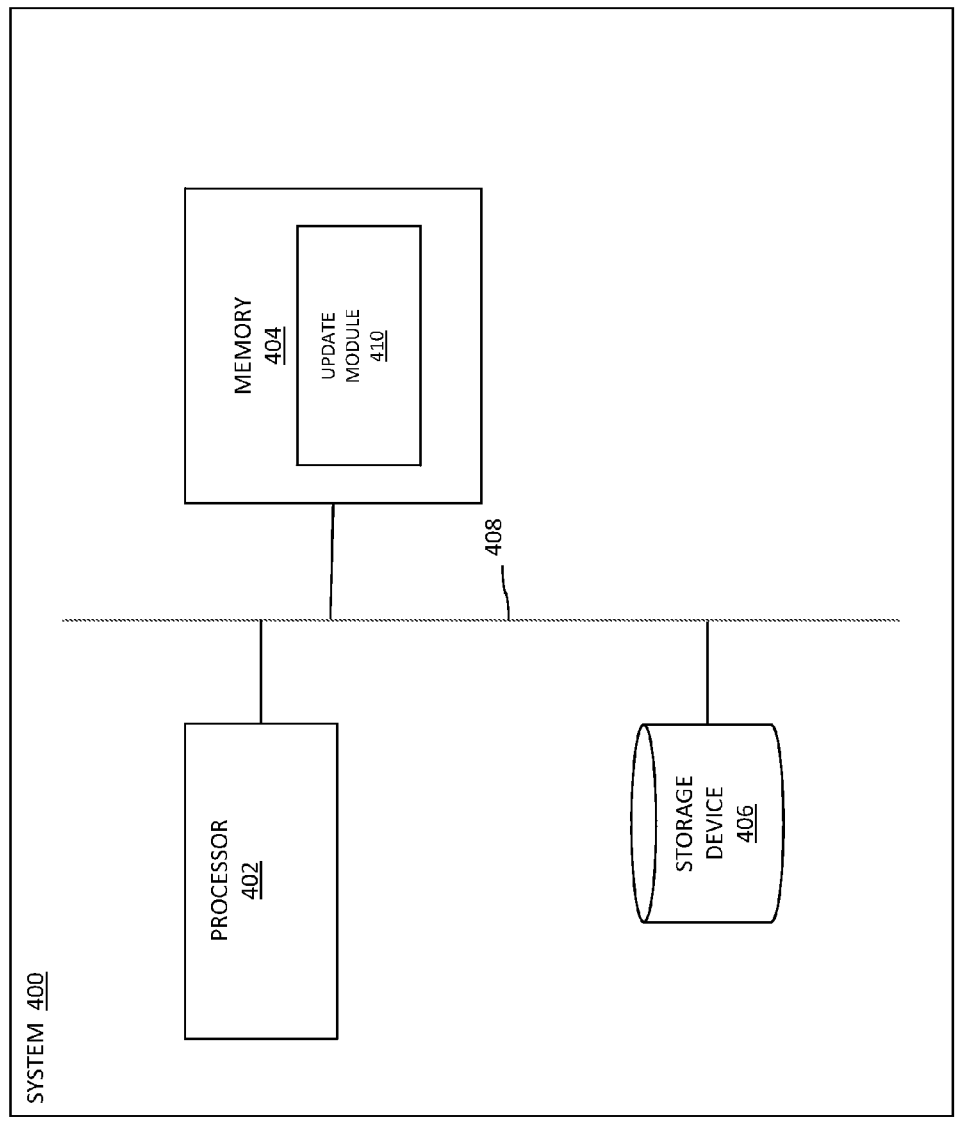
FIG. 4 is a high level block diagram of an exemplary general purpose computer system suitable for use in performing the functions described herein.

FIG. 4 depicts a high level block diagram of a general purpose computer system suitable for use in performing the functions described herein. As depicted in FIG. 4, system 400 includes a processor 402, a memory 404, and a storage device 406 communicatively connected via a system bus 408. In some embodiments, processor 402 can include a microprocessor, central processing unit (CPU), or any other like hardware based processing unit. In some embodiments, an update module 410 can be stored in memory 404, which can include random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of update module 410. In some embodiments, storage device 406 can include any storage medium or storage unit that is configured to store data accessible by processor 402 via system bus 408. Exemplary storage devices can include one or more local databases hosted by system 400.

As indicated above, the subject matter disclosed herein can be implemented in software in combination with hardware and/or firmware. For example, the subject matter described herein can be implemented in software executed by a processor. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms. As used the present disclosure, the terms "function" or "module" refer to hardware, firmware, or software in combination with hardware and/or firmware for implementing features described herein.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for generating instruction data to update components in a converged infrastructure system, the method comprising:
    identifying components in a converged infrastructure system that require remediation in order to comply with a defined converged infrastructure configuration by comparing software revision identifiers associated with the defined converged infrastructure configuration to software revision identifiers associated with the components in the converged infrastructure system;
    identifying remediation content to enable each of the identified components to be compliant with the defined converged infrastructure configuration, wherein the remediation content includes software to update the identified components;
    determining a remediation process based on the identified remediation content associated with the components of the converged infrastructure system, wherein the determined remediation process includes an order of steps used to update the identified components in the converged infrastructure system with the software, wherein the order of steps includes a minimum number of steps needed to update the identified components in the converged infrastructure system; and
    generating instruction data indicating the determined remediation process to be applied to the identified components in the converged infrastructure system.

2. The method of claim 1 further comprising receiving selection information indicating the defined converged infrastructure configuration to be applied to the converged infrastructure system.

3. The method of claim 1 further comprising retrieving the remediation content for the identified components from a repository.

4. The method of claim 3 wherein the generated instruction data indicates one or more locations in the repository where the remediation content is stored.

5. The method of claim 1 wherein generating the instruction data comprises generating the instruction data in at least one form from a group consisting of an electronic document form, a physical document form, and a visual display form.

6. A converged infrastructure system, the system comprising:
    an update module stored in a memory and configured to:
    identify components in a converged infrastructure system that require remediation in order to comply with a defined converged infrastructure configuration by comparing software revision identifiers associated with the defined converged infrastructure configuration to software revision identifiers associated with the components in the converged infrastructure system,
    identify remediation content to enable each of the identified components to be compliant with the defined converged infrastructure configuration, wherein the remediation content includes software to update the identified components, and
    determine a remediation process based on the identified remediation content associated with the components of the converged infrastructure system, wherein the determined remediation process includes an order of steps used to update the identified components in the converged infrastructure system with the software, wherein the order of steps includes a minimum number of steps needed to update the identified components in the converged infrastructure system; and
    an instruction data generation module stored in the memory and configured to generate instruction data indicating the determined remediation process to be applied to the identified components in the converged infrastructure system.

7. The system of claim 6 wherein the update module is further configured to receive selection information indicating the defined converged infrastructure configuration to be applied to the converged infrastructure system.

8. The system of claim 6 wherein the update module is further configured to retrieve the remediation content for the identified components from a repository.

9. The system of claim 8 wherein the generated instruction data indicates one or more locations in the repository where the remediation content is stored.

10. The system of claim 6 wherein the instruction data generation module is further configured to generate the instruction data in at least one form from a group consisting of an electronic document form, a physical document form, and a visual display form.

11. A non-transitory computer readable medium having stored thereon executable instructions that when executed by the processor of a computer control the computer to perform steps comprising:
    identifying components in a converged infrastructure system that require remediation in order to comply with a defined converged infrastructure configuration by comparing software revision identifiers associated with the defined converged infrastructure configuration to software revision identifiers associated with the components in the converged infrastructure system;
    identifying remediation content to enable each of the identified components to be compliant with the defined converged infrastructure configuration, wherein the remediation content includes software to update the identified components;
    determining a remediation process based on the identified remediation content associated with the components of the converged infrastructure system, wherein the determined remediation process includes an order of steps used to update the identified components in the converged infrastructure system with the software, wherein the order of steps includes a minimum number of steps needed to update the identified components in the converged infrastructure system; and generating instruction data indicating the determined remediation process to be applied to the identified components in the converged infrastructure system.

12. The non-transitory computer readable medium of claim 11 further comprising retrieving the remediation content for the identified components from a repository.

13. The non-transitory computer readable medium of claim 12 wherein the generated instruction data indicates one or more locations in the repository where the remediation content is stored.

14. The non-transitory computer readable medium of claim 11 wherein generating the instruction data comprises generating the instruction data in at least one form from a group consisting of an electronic document form, a physical document form, and a visual display form.

* * * * *